United States Patent [19]

DeCristofaro et al.

[11] 4,209,570
[45] Jun. 24, 1980

[54] HOMOGENEOUS BRAZING FOILS OF COPPER BASED METALLIC GLASSES

[75] Inventors: Nicholas J. DeCristofaro, Chatham; Claude Henschel, Mt. Freedom, both of N.J.

[73] Assignee: Allied Chemical Corporation, Morris Township, Morris County, N.J.

[21] Appl. No.: 947,329

[22] Filed: Oct. 2, 1978

[51] Int. Cl.$^2$ .......................... C22C 9/10; C25D 7/06; B21C 37/02
[52] U.S. Cl. .................................... 428/606; 75/159; 228/263 R
[58] Field of Search ................. 75/159, 134 C, 134 F; 428/606; 228/252, 263

[56] References Cited

U.S. PATENT DOCUMENTS

| | | | |
|---|---|---|---|
| 2,606,362 | 8/1952 | Martin et al. | 75/134 C |
| 3,871,836 | 3/1975 | Polk et al. | 75/134 F |
| 4,006,838 | 2/1977 | Baumann et al. | 75/159 |
| 4,148,973 | 4/1979 | Sexton et al. | 228/263 |

OTHER PUBLICATIONS

Weigert, "Physical Properties of Commerical Silver-Copper-Phosphorus Brazing Alloys," *The Welding Journal*, vol. 35, 1956, pp. 672–674.
"Copper and Copper Alloys"-*American Welding Society Brazing Manual*, Third Ed., 1976, pp. 169–183.
"Specification for Brazing Filler Metal," *American Welding Society*, Specification AS.8-76, pp. 2, 7–9, 19, 21, 22.
Williams, "The Basics of Copper Brazing," *Welding Design & Fabrication*, Apr. 1978, pp. 63–65.
"Brazing Filler Metals," American Welding Society Welding Handbook, vol. 2, 7th Ed., 1978, pp. 387–389, 391, 394, 395.

*Primary Examiner*—L. Dewayne Rutledge
*Assistant Examiner*—Peter K. Skiff
*Attorney, Agent, or Firm*—Ernest D. Buff; Gerhard H. Fuchs

[57] ABSTRACT

Novel glassy metal alloys and the brazing of metal parts employing a homogeneous ductile filler metal foil of these alloys is disclosed. The glassy metal alloys have a composition consisting essentially of 5 to 40 atom percent nickel, 15 to 20 atom percent phosphorus with the balance being copper and incidental impurities. These alloys can be produced in the form of foil useful for brazing metal articles, particularly articles composed of copper and copper alloys.

5 Claims, No Drawings

HOMOGENEOUS BRAZING FOILS OF COPPER BASED METALLIC GLASSES

BACKGROUND OF THE INVENTION

1. Field of the Invention

This invention relates to copper based metal alloys and more particularly to a homogeneous, ductile brazing material useful for brazing metal articles such as those composed of copper and copper alloys.

2. Description of the Prior Art

Brazing is a process for joining metal parts, often of dissimilar composition, to each other. Typically, a filler metal that has a melting point lower than that of the metal parts to be joined together is interposed between the metal parts to form an assembly. The assembly is then heated to a temperature sufficient to melt the filler metal. Upon cooling, a strong, corrosion resistant, leak-tight joint is formed.

The brazing alloys suitable for use with copper and copper alloys, designated AWS BCuP are well known compositions. These alloys contain a substantial amount (about 5 to 7.5 weight percent) of the metalloid element phosphorus. Consequently, such alloys are very brittle and are available only as powder or cast rod. Powders are generally unsuitable for many brazing operations, such as dip brazing, and do not easily permit brazing of complex shapes. Although some powders are available as pastes employing organic binders, the binders form objectionable voids and residues during brazing. Rods must be melted outside the joint and, when molten, are fed into the joint by capillary action.

Some brazing alloys are available in foil form. However, such materials are either fabricated only through a costly sequence of rolling and careful heat-treating steps or are prepared by powder metallurgical techniques. Rolled foil is not sufficiently ductile to permit stamping of complex shapes therefrom. Powder metallurgical foil is not homogeneous and employes binders, which form objectionable voids and residues during brazing.

Ductile glassy metal alloys have been disclosed in U.S. Pat. No. 3,856,513, issued Dec. 24, 1974 to H. S. Chen et al. These alloys include compositions having the formula $T_iX_j$, where T is at least one transition metal and X is an element selected from the group consisting of phosphorus, boron, carbon, aluminum, silicon, tin, germanium, indium, beryllium and antimony, "i" ranges from about 70 to about 87 atom percent and "j" ranges from about 13 to 30 atom percent. Such materials are conveniently prepared in powder, wire or foil form by rapid quenching from the melt using processing techniques that are now well-known in the art. However, no liquid-quenched glassy metal alloys of the family $T_iX_j$ described above, containing copper as the principal transition metal have been reported. Chen et al. report only one copper containing composition (e.g. $Pd_{77.5}Cu_6Si_{16.5}$) in U.S. Pat. No. 3,856,513. H. Suto and H. Ishikawa, Trans. Japan Inst. of Metals, V. 17, 1976, p. 596, report fabrication of glassy Cu-Si by vapor deposition.

There remains a need in the art for a homogeneous, copper based brazing material that is available in ductile foil form.

SUMMARY OF THE INVENTION

The present invention provides a copper based brazing alloy composition having at least partially glassy structure. The composition consists essentially of 5 to 40 atom percent nickel, 15 to 20 atom percent phosphorus, the balance being copper and incidental impurities.

In addition, the invention provides a homogeneous ductile brazing foil having a composition consisting essentially of 5 to 40 atom percent nickel, 15 to 20 atom percent phosphorus, the balance being copper and incidental impurities. Preferably, the brazing foil of this invention is at least partially glassy and consists essentially of 9 to 11 atom percent nickel, 17 to 19 atom percent phosphorus, the balance being copper and incidental impurities.

The homogeneous brazing foil of the invention is fabricated by a process which comprises forming a melt of the composition and quenching the melt on a rotating quench wheel at a rate of least about $10^{5°}$ C./sec.

Further, there is provided in accordance with the invention, an improved process for joining two or more metal parts by brazing. The process comprises:

(a) interposing a filler metal between the metal parts to form an assembly, the filler metal having a melting temperature less than that of any of the metal parts;

(b) heating the assembly to at least the melting temperature of the filler metal; and (c) cooling the assembly.

The improvement comprises employing, as the filler metal, a homogeneous, copper based foil that has the composition given above.

The filler metal foil is easily fabricable as homogeneous, ductile ribbon, which is useful for brazing as cast. Advantageously, the copper based metal foil can be stamped into complex shapes to provide braze preforms.

Advantageously, the homogeneous, ductile brazing foil of the invention can be placed inside the joint prior to the brazing operation. Use of the homogeneous, ductile copper based foil provided by this invention also permits brazing to be accomplished by processes such as dip brazing in molten salts, which are not readily accomplished with powder or rod-type fillers.

DETAILED DESCRIPTION OF THE INVENTION

Glassy metal alloys are formed by cooling a melt of the desired composition at a rate of at least about $10^{5°}$ C./sec. A variety of rapid quenching techniques, well known to the glassy metal alloy art, are available for producing glassy metal powders, wires, ribbon and sheet. Typically, a particular composition is selected, powders or granules of the requisite elements in the desired portions are melted and homogenized, and the molten alloy is rapidly quenched on a chill surface, such as a rapidly rotating cylinder, or in a suitable fluid medium, such as water.

Copper based brazing alloys have been fabricated by processes such as those described above. These alloys have at least partially glassy structure and consist essentially of 5 to 40 atom percent nickel, 15 to 20 atom percent phosphorus, the balance being copper and incidental impurities.

Glassy Cu-Ni-P alloys of the present invention demonstrate hardness values of approximately 430 to 700 kg/mm$^2$ (Vickers DPH microhardness). This range is generally lower than the 600–1000 kg/mm$^2$ range exhibited by the transition metal-metalloid glasses described in Chen et al. or in Polk et al., U.S. Pat. No. 4,052,201, issued Oct. 4, 1977, in which iron, nickel, cobalt and/or chromium are the principal transition metals and boron, carbon, silicon, phosphorus and aluminum are the principal metalloid elements.

The crystallization temperature of a metallic glass, Tc, can be determined by differential thermal analysis (DTA). The latter process involves slowly heating a glassy metal alloy and noting where excess heat is evolved over a limited temperature range. Upon being subjected to the DTA process, the glassy Cu-Ni-P alloys of this invention demonstrate initial crystallization temperatures in the range of approximately 190° to 270° C. By comparison, the transition metal-metalloid glassy alloys described in Chen et al. and Polk et al. generally demonstrate initial crystallization temperatures of 400° to 500° C.

The DTA process is also used to determine the melting and solidification behavior of metal alloys. When subjected to the DTA process, the Cu-Ni-P compositions of the present invention have liquidus temperatures ranging from approximately 670° to 820° C. during the heating step. The transition metal-metalloid alloys described in Chen et al. and Polk et al., on the other hand, have liquidus temperatures ranging from approximately 900° C. to over 1200° C. during the heating step. The alloys taught by Chen et al. and Polk et al., as well as pure copper and the BCuP brazing alloys set forth below in Table I have liquidus temperatures substantially higher than those contained by the alloys of the present invention. As a result, the alloys of this invention are better suited for brazing than the prior art BCuP alloys or the alloys of Chen et al. or Polk et al.

TABLE I

| BCuP BRAZING FILLER METALS (American Welding Society A5.8 Specifications) | | | | | |
|---|---|---|---|---|---|
| Designation | Alloy Composition (wt. %) | | | Solidus (C) | Liquidus (C) | Brazing Range (C) |
| | Cu | Ag | P | | | |
| BCuP-1 | Bal | — | 5. | 710 | 924 | 788–927 |
| BCuP-2 | " | — | 7.2 | 710 | 793 | 732–843 |
| BCuP-3 | " | 5. | 6.0 | 643 | 813 | 718–816 |
| BCuP-4 | " | 6. | 7.2 | 643 | 718 | 691–788 |
| BCuP-5 | " | 15. | 5.0 | 643 | 802 | 704–816 |
| BCuP-6 | " | 2. | 7.0 | 643 | 788 | 732–816 |
| BCuP-7 | " | 5. | 6.7 | 643 | 771 | 704–816 |

In any brazing process, the brazing material must have a melting point that will be sufficiently high to provide strength to meet service requirements of the metal parts brazed together. However, the melting point must not be so high as to make difficult the brazing operation. Further, the filler material must be compatible, both chemically and metallurgically, with the materials being brazed. The brazing material must be more noble than the metals being brazed to avoid corrosion. Ideally, the brazing material must be in ductile foil form so that complex shapes may be stamped therefrom. Finally, the brazing foil should be homogeneous, that is, contain no binders or other materials that would otherwise form voids or contaminating residues during brazing.

In accordance with the invention, a homogeneous, ductile brazing material in foil form is provided. The brazing foil has a composition consisting essentially of 5 to 40 atom percent nickel, 15 to 20 atom percent phosphorus and the balance essentially copper and incidental impurities. These compositions are compatible with copper and copper-based alloys and are particularly suited for joining these materials.

By homogeneous is meant that the foil, as produced, is of substantially uniform composition in all dimensions. By ductile is meant that foil can be bent to a round radius as small as ten times the foil thickness without fracture.

Examples of brazing alloy compositions within the scope of the invention are set forth in Table II below.

TABLE II

| | Composition, atom % | | |
|---|---|---|---|
| | Cu | Ni | P |
| 1 | 75 | 10 | 15 |
| 2 | 72 | 10 | 18 |
| 3 | 60 | 20 | 20 |
| 4 | 57 | 30 | 18 |

Within the broad range disclosed above, there is a preferred composition range that is compatible with and permits brazing of copper and a wide range of copper alloys under a wide range of atmospheric conditions. Such preferred composition range permits copper and copper alloys to be joined under substantially all brazing conditions. The preferred composition range consists essentially of 9 to 11 atom percent nickel, 17 to 19 atom percent phosphorus, the balance being essentially copper and incidental impurities.

Further, in accordance with the invention, an improved process for joining two or more metal parts is disclosed. The process comprises:
 (a) interposing a filler metal between the metal parts to form an assembly, the filler metal having a melting temperature less than that of any of the metal parts;
 (b) heating the assembly to at least the melting temperature of the filler metal; and
 (c) cooling the assembly.

The improvement comprises employing, as the filler metal, at least one homogeneous, copper based foil having a composition within the ranges given above.

The brazing foils of the invention are prepared from the melt in the same manner as glassy metal foils. Under these quenching conditions, a metastable, homogeneous, ductile material is obtained. The metastable material may be glassy, in which case there is no long range order. X-ray diffraction patterns of glassy metal alloys show only a diffuse halo, similar to that observed for inorganic oxide glasses. Such glassy alloys should be at least 50% glassy to be sufficiently ductile to permit subsequent handling, such as stamping complex shapes from ribbons of the alloys. Preferably, the glassy metal alloys should be totally glassy, to attain superior ductility.

The metastable phase may also be a solid solution of the constituent elements. In the case of the alloys of the invention, such metastable, solid solution phases are not ordinarily produced under conventional processing techniques employed in the art of fabricating crystalline alloys. X-ray diffraction patterns of the solid solution alloys show the sharp diffraction peaks characteristic of crystalline alloys, with some broadening of the peaks due to desired fine-grained size of crystallites. Such metastable materials may also be ductile when produced under the conditions described above.

The brazing material of the invention is advantageously produced in foil (or ribbon) form, and may be used in brazing applications as cast, whether the material is glassy or a solid solution. Alternatively, foils of glassy metal alloys may be heat treated to obtain a crystalline phase, preferably fine-grained, in order to promote longer die life when stamping of complex shapes is contemplated.

Foils as produced by the processing described above typically are about 0.0010 to 0.0025 inch thick, which is also the desired spacing between bodies being brazed. Such spacing maximizes the strength of the braze joint. Thinner foils stacked to form greater thicknesses may also be employed. Further, no fluxes are required during brazing, and no binders are present in the foil. Thus, formation of voids and contaminating residues is eliminated. Consequently, the ductile brazing ribbons of the invention provide both ease of brazing, by eliminating the need for spacers, and minimal post-brazing treatment.

The brazing foils of the invention are also superior to various powder brazes of the same composition in providing good braze joints. This is probably due to the ability to apply the brazing foil where the braze is required, rather than depending on capillarity to transport braze filler from the edge of surfaces to be brazed.

EXAMPLE 1

Ribbons about 2.5 to 6.5 mm (about 0.10 to 0.25 inch) wide and about 25 to 60 μm about (about 0.0010 to 0.0025 inch) thick were formed by squirting a melt of the particular composition by overpressure of argon onto a rapidly rotating copper chill wheel (surface speed about 3000 to 6000 ft/min). Metastable, homogeneous alloy ribbons having at least partially glassy atomic structure and consisting essentially of the following compositions in atom percent were produced:

| Sample No. | Composition (atom %) | | |
|---|---|---|---|
| | Cu | Ni | P |
| 1 | 75 | 7 | 18 |
| 2 | 75 | 10 | 15 |
| 3 | 72 | 10 | 18 |
| 4 | 67 | 15 | 18 |
| 5 | 62 | 20 | 18 |
| 6 | 52 | 30 | 18 |
| 7 | 70 | 10 | 20 |
| 8 | 60 | 20 | 20 |

EXAMPLE 2

Selected ribbons from Example 1 were tested for Vickers diamond pyramid hardness (DPH) with the following results:

| Sample No. | Composition (Atom %) | | | DPH (Kg/mm$^2$) |
|---|---|---|---|---|
| | Cu | Ni | P | |
| 1 | 75 | 10 | 15 | 521 |
| 2 | 72 | 10 | 18 | 435 |
| 3 | 67 | 15 | 18 | 464 |
| 4 | 62 | 20 | 18 | 473 |
| 5 | 57 | 30 | 18 | 677 |
| 6 | 60 | 20 | 20 | 526 |

EXAMPLE 3

The initial crystallization temperature (Tc) and the solidus (Ts) and liquidus (Tl) temperatures of selected ribbons from Example 1 were determined by DTA. The results of the DTA are set forth below:

| Sample No. | Composition (atom %) | | | Tc* (°C.) | Ts** (°C.) | Tl** (°C.) |
|---|---|---|---|---|---|---|
| | Cu | Ni | P | | | |
| 1 | 75 | 10 | 15 | 219 | 632 | 678 |
| 2 | 72 | 10 | 18 | 194 | 630 | 690 |
| 3 | 67 | 15 | 18 | 229 | 632 | 714 |
| 4 | 62 | 20 | 18 | 262 | 632 | 744 |
| 5 | 52 | 30 | 18 | 268 | 629 | 814 |
| 6 | 60 | 20 | 20 | 225 | 629 | 707 |

*heating rate of 20° C./sec.
**heating rate of 10° C./sec.

EXAMPLE 4

Lap shear test specimens were prepared according to AWS C 3.2 "Standard Method for Evaluating the Strength of Brazed Joints". Copper sheet, ⅛ inch thick, was used as the base metal. Glassy metal $Cu_{72}Ni_{10}P_{18}$ ribbon 0.0011 inch thick and 0.250 inch wide was used as the brazing filler metal. Brazed joints of the lap type were prepared. The lap dimension was carefully controlled at ⅜ inch (3×thickness of the base metal). Brazing was done in a belt furnace with a dry, cracked ammonia atmosphere. The furnace was operated at 1350° F. (732° C.) at 1 ft/min. The length of the hot zone was 8 ft.

For comparison, identical joints were prepared using BCuP-5 foil 0.0010 inch thick as a filler metal (Metbraze® 15, manufactured by Metz Metallurgical Corp., S. Plainfield, N.J.). BCuP-5 is the only BCuP alloy available in foil form suitable for the production of thin, 0.0010 to 0.0025 inch, joints. Of the BCuP alloys, BCuP-5 produces joints with the greatest shear strengths (K. Weigert, The Welding Journal, V. 35, 1956, pg. 672 to 674).

Mechanical properties of the brazed joints are given below:

| Sample No. | Brazing Foil | Shear Strength (psi) | Tensile Strength (psi) |
|---|---|---|---|
| 1 | BCuP-5 | 8,925 | 26,774 |
| 2 | $Cu_{72}Ni_{10}P_{18}$ | 8,172 | 24,516 |
| 3 | BCuP-5 | 7,634 | 22,903 |
| 4 | $Cu_{72}Ni_{10}P_{18}$ | 7,796 | 23,387 |
| 5 | BCuP-5 | 8,280 | 24,839 |
| 6 | $Cu_{72}Ni_{10}P_{18}$ | 7,043 | 21,129 |
| 7 | $Cu_{72}Ni_{10}P_{18}$ | 7,796 | 23,387 |
| 8 | BCuP-5 | 7,796 | 23,387 |
| | | BCuP-5 | $Cu_{72}Ni_{10}P_{18}$ |
| Ave. Shear Strength | | 8,159 psi sigma = 580 | 7,702 psi sigma = 474 |
| Ave. Tensile Strength | | 24,476 psi sigma = 1739 | 23,105 psi sigma = 1421 |

Analyses of the mechanical properties data indicate that no differences of statistical significance exist between joints bonded with BCuP-5 foil and joints bonded with $Cu_{72}Ni_{10}P_{18}$ foil.

Having thus described the invention in rather full detail, it will be understood that these details need not be strictly adhered to but that further modifications of the invention may suggest themselves to one skilled in the art, all falling within the scope of the invention as defined by the subjoined claims.

What is claimed is:

1. A homogeneous ductile brazing foil having at least partially glassy structure and a composition consisting essentially of 5 to 40 atom percent nickel, 15 to 20 atom percent phosphorus, the balance being copper and incidental impurities.

2. A homogeneous brazing foil having a composition consisting essentially of 9 to 11 atom percent nickel, 17 to 19 atom percent phosphorus, the balance being copper and incidental impurities.

3. A brazing foil as recited in claim 1, said foil having a thickness ranging from about 0.0010 to 0.0025 inch.

4. A brazing foil as recited in claim 1, said foil having at least about 50% glassy structure.

5. A brazing foil as recited in claim 1, said foil having totally glassy structure.

* * * * *